(12) United States Patent
Martorell

(10) Patent No.: US 8,427,264 B1
(45) Date of Patent: Apr. 23, 2013

(54) ARTICLE MADE OF AN INJECTED MATERIAL WITH A BUILT-IN MAGNET AND THE MANUFACTURING METHOD

(71) Applicant: Magic Box Int. Toys, S.L.U., Barcelona (ES)

(72) Inventor: David Bella Martorell, Barcelona (ES)

(73) Assignee: Magic Box Int. Toys, S.L.U., Barcelona (ES)

( * ) Notice: Subject to any disclaimer, the term of this patent is extended or adjusted under 35 U.S.C. 154(b) by 0 days.

(21) Appl. No.: 13/668,684

(22) Filed: Nov. 5, 2012

(30) Foreign Application Priority Data

Nov. 7, 2011 (ES) .................................. 201131782

(51) Int. Cl.
*H01F 3/00* (2006.01)
*H01F 7/02* (2006.01)
*B29C 45/14* (2006.01)

(52) U.S. Cl.
USPC ................. 335/303; 264/272.15; 264/272.19; 264/274; 264/275; 264/278

(58) Field of Classification Search .................. 335/303; 264/272.15, 272.19, 274, 275, 278; 446/92, 446/129–139
See application file for complete search history.

(56) References Cited

U.S. PATENT DOCUMENTS

| | | | | |
|---|---|---|---|---|
| 3,615,993 A | * | 10/1971 | French .......................... | 156/155 |
| 8,016,636 B2 | * | 9/2011 | Park .............................. | 446/92 |
| 2012/0270465 A1 | * | 10/2012 | Park .............................. | 446/129 |

* cited by examiner

*Primary Examiner* — Ramon Barrera
(74) *Attorney, Agent, or Firm* — Leason Ellis LLP

(57) ABSTRACT

An article for use in various industries including for manufacturing toys, promotional articles, and decorative articles using plastic includes a body (1), a built-in magnet (3) and a receptacle (2) with side arms (21) embedded in the body (1). The receptacle (2) has a base (23), an opening (25) for introducing the magnet (3), and a closure lid (4) for closing the opening (25).

7 Claims, 3 Drawing Sheets

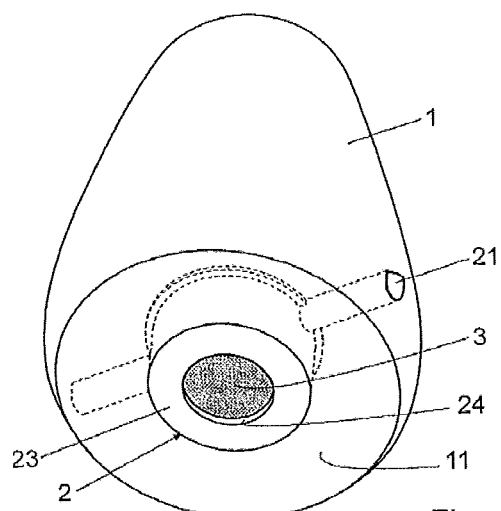
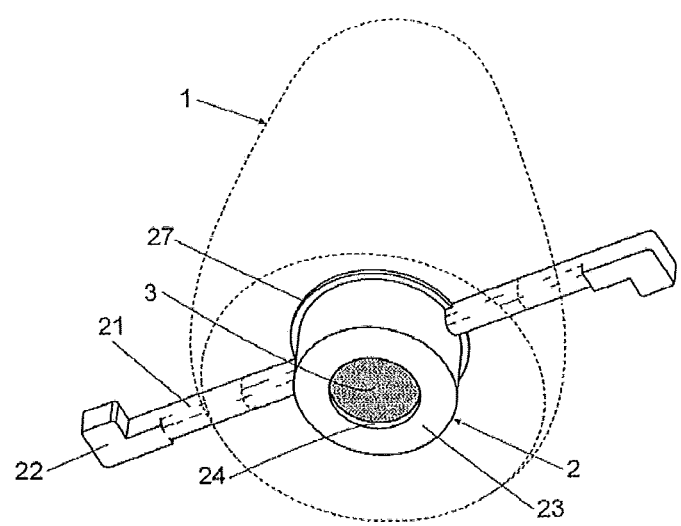

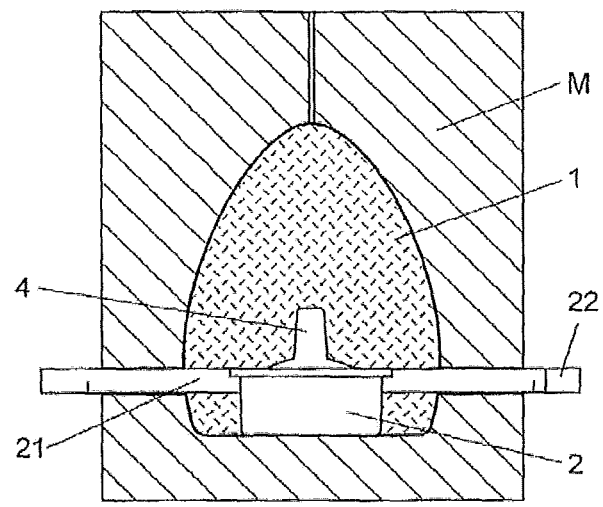
Fig. 5
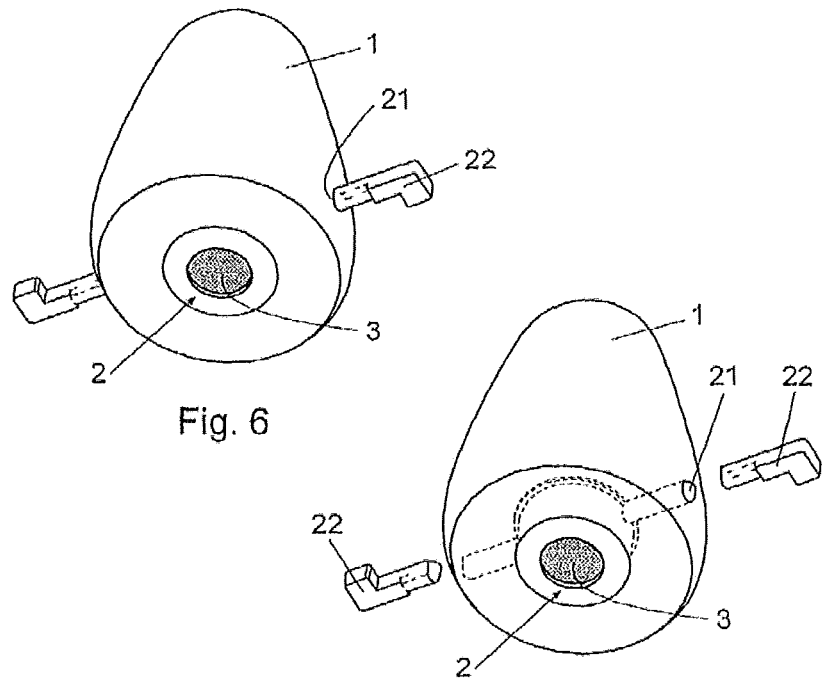
Fig. 6
Fig. 7

ARTICLE MADE OF AN INJECTED MATERIAL WITH A BUILT-IN MAGNET AND THE MANUFACTURING METHOD

OBJECT OF THE INVENTION

The present invention relates to an article made of an injected material with a built-in magnet and a manufacturing method, said article being of the type comprising a body made of an injected material with a magnet or magnetic element fixed therein, this magnet being arranged close to one of the outer faces of the body made of an injected material, enabling fixing the magnet completely and firmly inside the body and the magnetic properties of this magnet not being altered by the high temperature obtained inside the mould when injecting the injected molten material during the injection of said body of the article.

FIELD OF APPLICATION OF THE INVENTION

The invention is applicable in the industry of articles manufactured by material injection which are provided with a magnet for various purposes, especially the industry for manufacturing toys, promotional articles and decorative articles using plastic.

BACKGROUND OF THE INVENTION

Different articles made from material injection, for example plastic, and comprising a magnet or magnetic element in at least one of their faces are known today. This magnet enables the article to be arranged on ferric surfaces or to be coupled to another article. One example of these articles is the different toys or promotional figures having the magnet in their base to enable arranging them more or less firmly on a ferric surface.

Another example is that of those known as "refrigerator magnets" which also comprise a body or decorative part, provided with a flat rear part, provided with a hollow in which the magnet allowing the fixing thereof is located.

As mentioned, in most of these articles the magnet is arranged in a housing or hole of the body and fixed by means of an adhesive or glue. This conformation poses a technical problem consisting of the possibility of magnet detachment which is dangerous especially in toys due to the risk of an accident in children who may swallow the magnet.

If attempts are made to place the magnet inside the mould before injecting the material forming the body of the article, this magnet is embedded inside the body and is not removable. However the high temperature with which the material of the body is injected into the mould affects the magnetic properties of the magnet which can become demagnetised.

In certain cases the magnet can lose all its magnetic capacity due to the high temperature obtained inside the mould, and therefore the article is useless.

This demagnetisation risk does not allow assuring the product manufacturing reliability and is unacceptable both for the manufacturer and for the possible customers or users thereof.

Another problem lies in the difficulty of placing the magnet inside the injection mould before injecting the material of the body since the magnet can move from its place due to the pressure of the injected material.

European patent EP455921 "Magnet to be assembled with an injected plastic material", describing a magnet having at least two grooves or groups of grooves inclined with respect to the base on its side faces and located on two opposite areas of the magnet, is known. This magnet is then embedded in an injected plastic material.

These magnets are applied in multiple transducers such as drives for loom or printer needles. This magnet is intended for light use, such as for activating transducers, where the magnetic field of the magnet must not have such a strong force so as to adhere an entire body of a toy article. Furthermore, in the applications described in said European patent the magnet detachment is not as risky as in a toy or promotional article, so the solution described is not applicable to the technical problem considered.

DESCRIPTION OF THE INVENTION

The article made of an injected material with a built-in magnet and the manufacturing method object of this invention has technical particularities intended for enabling a permanent immobilisation of the magnet inside the article, without the magnetization of said magnet being affected by heat during the process of injecting the material of the body of the article.

The article made of an injected material with a built-in magnet comprises a body made of an injected material having at least one magnet or magnetic element built in close to an outer face.

According to the invention, the article comprises a hollow receptacle having at least one securing side arm embedded in the body of the article. Said receptacle has a base arranged in correspondence with the outer surface of the body, and an opening for introducing the magnet on a face different from the base, a closure lid being arranged on this opening.

In one embodiment of the invention the base of the receptacle has a hole smaller than the magnet housed inside it. This hole allows exposing the magnet to the outside and using powerful magnets since the magnetic attractive force is not reduced by any outer covering layer.

The assembly formed by the receptacle and the lid has two main functions consisting of permanently and securely keeping the magnet inside the body of the article since said receptacle and lid are integrated during injection. A second function of the receptacle and lid assembly is the thermal insulation of the magnet with respect to the heat given off by the molten material with which the body is made during injection. This thermal insulation prevents the magnet from being subjected to high temperatures during injection and therefore becoming demagnetised and the magnetic field flux being reduced or annulled. On one hand, the hole in the base of the receptacle enables handling the magnet and verifying its position and that the magnetic field flux freely flows outwards through the air.

In a preferred embodiment, the receptacle and the lid are made of a material having a melting temperature equal to or greater than the material of the body to be injected. Its integrity is thus assured during injection. Therefore the material which is injected, for example molten plastic, does not alter said receptacle and lid which withstand the thermal impact received without being altered when filling the mould and extracting the solidified body.

In one embodiment, the receptacle and the lid have flanges on their inner faces for separating and centring the magnet. The magnet is thus separated from the hot walls of the receptacle in contact with the injection material, thus achieving greater thermal insulation.

In a preferred embodiment, the lid comprises a projection for being seized by automated means. The manufacture of the articles can thus be fully automated using a suitable robot or mechanism which grabs the already assembled receptacle, magnet and lid assembly and places it inside the mould.

In one embodiment, the receptacle comprises at least one perimetral flange or rib for fixing to the body of the article once said article is formed. This perimetral flange or rib collaborates in fixing the receptacle in the base of the article.

The manufacturing method for manufacturing an article made of an injected material with a built-in magnet of this invention comprises the phases of:
- introducing a magnet in the receptacle,
- placing a closure lid for closing the receptacle,
- placing the receptacle, magnet and lid assembly in an injection mould, where the assembly is secured by the side arms of the receptacle,
- closing the mould and injecting the material forming a body,
- opening the mould and extracting the article formed once the body solidifies and,
- removing the ends of side arms protruding from the body of the injected article.

This method assures the correct positioning of the magnet inside the mould during the injection of the molten material forming the body of the article and at the same time protects the magnet against the effect of the heat of said molten material. The side arms can have shapes at their terminal ends suitable for being fixed at anchoring points or areas provided for that purpose inside the mould. These terminals and the anchors in the moulds can be standardised, whereby one and the same receptacle can be used for making different articles, thus reducing the need of having different references.

The coplanar positioning of the face or base of the receptacle provided with the hole with the outer face serving as the base or support of the body of the article is assured and offers a perfect finish.

DESCRIPTION OF THE DRAWINGS

To complement the description which is being made and for the purpose of aiding to better understand the features of the invention a set of drawings is attached to the present specification in which the following has been depicted with an illustrative and non-limiting character:

FIG. 1 shows a bottom perspective view of the article, showing the visible part of the receptacle and of the magnet in the support base or face of the article.

FIG. 2 shows a view similar to the preceding figure in which the body has been depicted as transparent, tracing its outline with a dotted line and the receptacle, magnet and lid assembly with a solid line.

FIGS. 5, 6 and 7 show successive views of the manufacturing method for manufacturing the article with the built-in magnet according to the invention.

PREFERRED EMBODIMENT OF THE INVENTION

Figure 3:
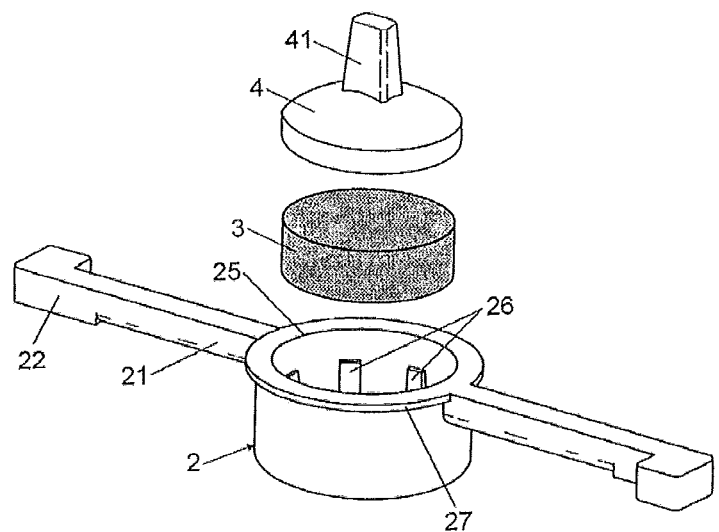
FIG. 3 shows an exploded view of the receptacle, magnet and closure lid assembly.

As shown in the mentioned drawings, an article of the invention comprises a body (1) made of an injected material, in this case plastic, and having a considerably planar face (11) in the base, in which a receptacle (2) for housing a magnet (3) or magnetic element is arranged in a flush manner, this receptacle (2) also being made of a plastic material.

In this case, the receptacle (2) has a hollow cylindrical shape with two side arms (21) arranged approximately radially and ending in terminals (22) serving as securing points, inside or outside the injection mould (M), these terminals (22) being removed once the article is injected into and extracted from the mould (M), in this case cut flush with the body (1). The remaining sections of the side arms (21) are embedded inside the injected body (1), both elements being integral in a completely inseparable manner as depicted in FIGS. 5 to 7.

Figure 4:
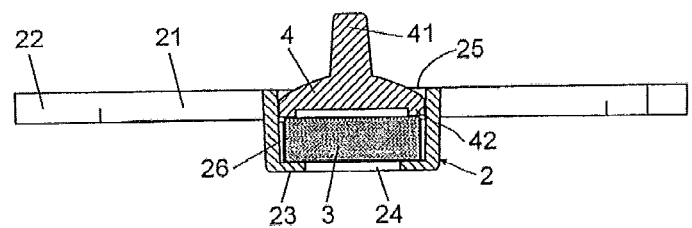
FIG. 4 shows an elevational view of the receptacle, magnet and lid assembly, sectioned by a vertical plane and with the magnet positioned inside it.

As depicted in FIGS. 3 and 4, the receptacle (2) has a hole (24) smaller than the magnet (3) in a base (23) or face intended for being arranged on the outside.

An opening (25) for introducing the magnet (3) and on which there is placed a snap-fitted closure lid (4) is located in the opposite face or base of the receptacle (2). This lid (4) has a projection (41) for seizing the receptacle (2), magnet (3) and the mentioned lid (4) assembly when placed inside the mould (M). Flanges (26, 42) distributed around the magnet (3) and defining separations of this magnet (3) with respect to the walls of the receptacle (2) and the lid (4) are located inside the receptacle (2) and the lid (4).

In one embodiment, the receptacle (2) has a perimetral rib (27) close to the base of the opening (25) for introducing the magnet (3), this rib (27) being embedded in the body (1) for strengthening the immobility of the receptacle (2) and its integral attachment with said body (1).

Having sufficiently described the nature of the invention as well as a preferred embodiment, it is hereby stated for all relevant purposes that the materials, shape, size and arrangement of the elements described could be modified provided that it does not alter the essential features of the invention claimed below.

The invention claimed is:

1. An article made of an injected material with a built-in magnet of the type comprising:
   a body (1) made of an injected material having at least one built-in magnet (3) or magnetic element close to an outer face (11) thereof, wherein the body comprises a hollow receptacle (2) having at least one securing side arm (21) embedded in the body (1) of the article, said receptacle (2) having a base (23) intended for being arranged on the outside of the body (21) and in an opening (25) for introducing the magnet (3) into said receptacle; said opening (25) being provided with a closure lid (4).

2. The article according to claim 1, wherein the receptacle (2) has a hole (24) in its base smaller than the inner magnet (3).

3. The article according to claim 1, wherein the receptacle (2) and the lid (4) are made of a material having a melting temperature equal to or greater than the material of the body (1) to be injected.

4. The article according to claim 1, wherein the receptacle (2) and the lid (4) have flanges (26, 42) in their inner faces for separating and centring the magnet (3).

5. The article according to claim 1, wherein the lid (4) comprises a projection (41) for being seized by automated means.

6. The article according to claim 1, wherein the receptacle (2) comprises at least one perimetral rib (27) or flange for fixing to the body (1).

7. A manufacturing method for manufacturing an article made of an injected material with a built-in magnet comprising the steps of:
   introducing a magnet (3) in a receptacle (2) provided with an opening (25) and with side arms (21),
   placing a closure lid (4) on the opening (25) of the receptacle (2), placing the receptacle (2), magnet (3) and lid (4) assembly in an injection mould (M), where the assembly is secured by the side arms (21) of the receptacle (2), closing the mould (M) and injecting the material forming a body (1) of the injected article to be manufactured, opening the mould (M) and extracting the article formed once the body (1) solidifies and, removing the ends of side arms (21) protruding from the body (1) of the injected article.

\* \* \* \* \*